J. B. BEALL & B. F. GRIM.
ROAD SCRAPER.
No 60,325. Patented Dec. 11, 1866.
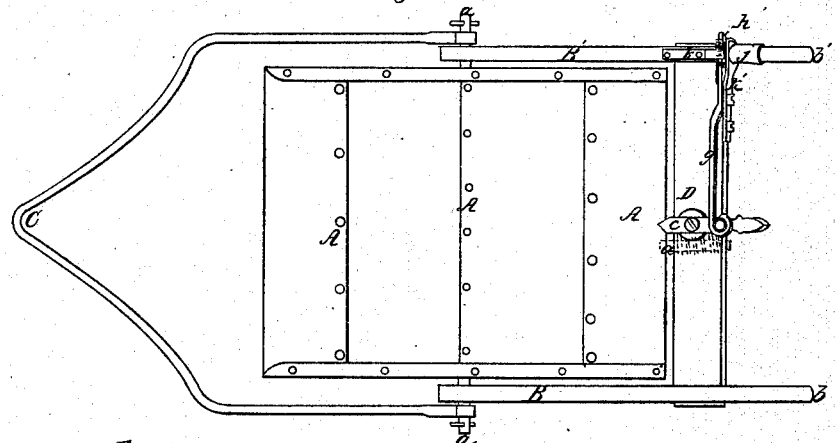
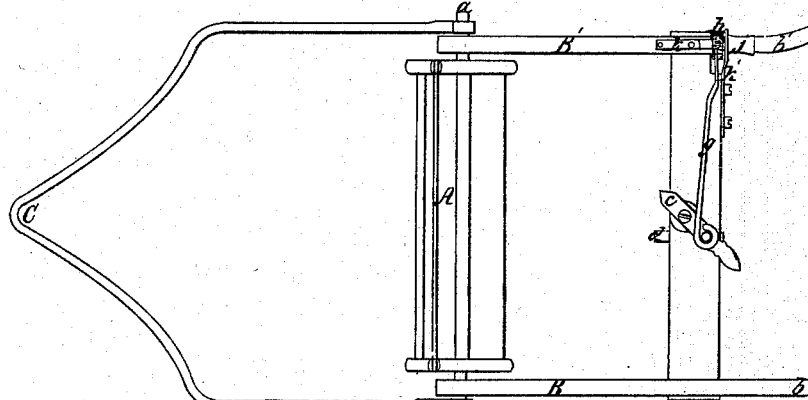
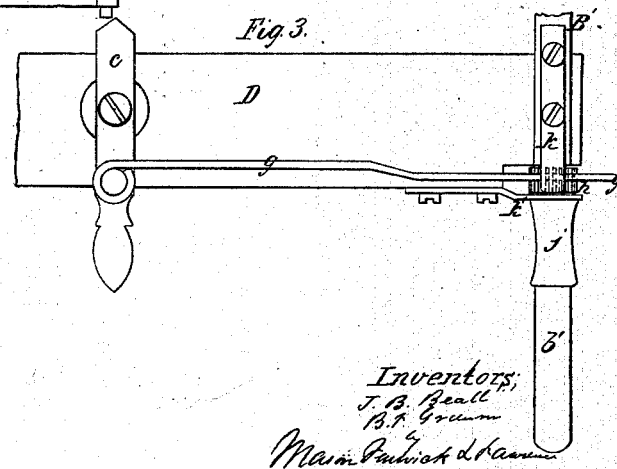

United States Patent Office.

IMPROVED ROAD SCRAPER.

J. B. BEALL AND B. F. GRIM, OF WESTERVILLE, OHIO.

Letters Patent No. 60,325, dated December 11, 1866.

---

The Schedule referred to in these Letters Patent and making part of the same.

---

TO ALL WHOM IT MAY CONCERN:

Be it known that we, JEROME B. BEALL and BENJAMIN F. GRIM, of Westerville, Franklin county, State of Ohio, have invented a new and Improved Road Scraper; and we do hereby declare that the following is a full, clear, and exact description thereof, reference being had to the accompanying drawings, making a part of this specification, in which—

Figure 1 is a bottom view of a reversible scraper having our improvement applied to it.

Figure 2 is a similar view showing the scraper in the act of turning over.

Figure 3 is an enlarged bottom view of the device for holding the scraper in position and releasing it when desired.

Figure 4 is a front or edge view of the same device.

Similar letters of reference indicate corresponding parts in the several figures.

This invention relates to an improvement on revolving or reversible scrapers which are designed for levelling roads, and other purposes. It consists in providing the frame, to which the scraper is pivoted with a device, by means of which the attendant, having hold of the handles of the scraper, can release the latter, from a latch, at pleasure, without removing either hand from said handles, or stopping the horse drawing the machine, as will be hereinafter described, To enable others skilled in the art, to understand this invention we will describe its construction and operation.

In the accompanying drawings, A represents a well known revolving or reversible scraper which is pivoted to the ends of two handles, B B', in such manner that when one part of the scraper is filled the other part can be brought into working position by allowing the scraper to turn over. This scraper is pivoted by a transverse rod, $a$, to the ends of the handles; and the extremities of this rod project far enough from the sides of the scraper to receive the eyes, which are formed on the rear ends of a hitching bow, C, to which a horse is attached, for drawing the scraper. The arms or handles, B B', are connected together near their curved hand pieces, $b$ $b'$ by means of a transverse cross-bar, D, to the middle of which, and on its upper surface a vibrating latch $c$, is pivoted, as shown in the several figures of the drawings. The forward end of this latch projects beyond the front edge of the cross-bar, D, far enough to catch over that edge of the scraper which is uppermost, and out of operation, and prevent the scraper from turning over and discharging its load when in operation. To prevent that edge of the scraper which is uppermost, and which is arrested by the latch $c$, from dropping down a spring latch, $d$, is used, which is applied to the bottom of the cross-bar D, and so constructed as to be self-acting. The two catches $c$ and $d$, will hold the scraper in position for operation whichever edge is uppermost. To the rear part of the latch $c$, a transverse rod, $g$, is pivoted, which has rack-teeth formed on its lower edge near its outer end. The teeth of this rod engage with the teeth of a spur-wheel, $h$, which is secured fast to a tube or sleeve, $j$, that is allowed to turn freely on the end of arm B'. This sleeve $j$, receives into its rear end the curved handle or hand-piece $b'$, so that by turning this hand-piece in one direction the latch, $c$, will release the scraper, and by turning it back again this latch will be brought in a position for catching and arresting the scraper. The two plates, $k$, and $k'$, prevent the hand-piece from being detached from arm B', and also serve as guides for keeping the toothed end of rod $g$, in place upon the spur-wheel $h$.

Believing ourselves the first to have invented any means which will admit of the release of the scraper, so that it can be revolved or reversed at pleasure, without requiring the attendant to remove his hands from the handles, we do not confine ourselves to the precise construction and arrangement of parts herein described and shown for effecting this object, as other analogous means may be employed.

Having described our invention, what we claim as new, and desire to secure by Letters Patent, is—

1. In a reversible road scraper, connecting the latch, $c$, to a loosely turning handle-piece $b'$, by means which will allow of the movement of said latch by turning the handle-piece, without removing the hands from either of the handles, substantially as described.

2. The combination of a vibrating-latch, $c$, a sliding spring-latch $d$, and a movable hand-piece, $b'$, substantially as described, with a reversible scraper.

JEROME B. BEALL,
BENJAMIN F. GRIM.

Witnesses:
JOHN S. HOOVER,
LEWIS B. CROUT.